United States Patent [19]

Scranton et al.

[11] Patent Number: 4,669,013

[45] Date of Patent: May 26, 1987

[54] MULTIPLE COILS FOR REDUCTION OF STRAY MAGNETIC FIELDS IN DISK FILE ACTUATORS

[75] Inventors: Robert A. Scranton; David A. Thompson, both of South Salem; Thomas K. Worthington, New York, all of N.Y.

[73] Assignee: International Business Machines Corporation, Armonk, N.Y.

[21] Appl. No.: 718,911

[22] Filed: Apr. 2, 1985

[51] Int. Cl.⁴ .................... G11B 21/08; H02K 41/00
[52] U.S. Cl. ...................................... 360/106; 310/13
[58] Field of Search .................... 360/106, 78; 310/13

[56] References Cited

U.S. PATENT DOCUMENTS 3,599,020  8/1971  Harris et al. ........................ 310/13
4,314,295  2/1982  Frandsen ............................. 360/97

*Primary Examiner*—Robert S. Tupper
*Attorney, Agent, or Firm*—Morgan & Finnegan

[57] ABSTRACT

A linear disk actuator is disclosed incorporating a magnetic circuit for reducing stray magnetic fields in the region of the disks and recording heads of a magnetic recording disk system. The moving part of the actuator is provided with a plurality of coils mounted thereon, at least two of which are energized simultaneously and in magnetically opposing relationship to reduce the amplitude of the stray magnetic fields. Movement of the actuator is achieved by both energized coils interacting with a set of alternating poles positioned on the stationary part of the actuator.

19 Claims, 8 Drawing Figures

MULTIPLE COILS FOR REDUCTION OF STRAY MAGNETIC FIELDS IN DISK FILE ACTUATORS

DESCRIPTION

Technical Field

This invention relates to magnetic recording disk systems, and more particularly, to a magnetic circuit for a linear disk actuator which minimizes stray magnetic fields in the region of the disks and recording heads of a recording disk system.

The design of any linear disk actuator is constrained by a requirement that the stray magnetic fields induced by the actuator coil in the region of the recording disks and recording heads be low in amplitude. The presence of high amplitude fields in this region can cause erasure of information stored on the disks. Somewhat lower amplitude fields can also be a problem in that they can be concentrated by the recording heads to still cause disk erasure. At even lower amplitudes, stray magnetic fields can still cause write asymmetry and peak shift, both of which lead to an increased error rate in the disk file. Although the precise amplitude of stray field that will cause problems for a given system depends on the magnetic properties of the recording media, head design, recording density and code being used, it can be said that generally fields of 50 gauss or more are intolerable, while fields as low as 10 gauss are still cause for concern. A field of 5 gauss is generally tolerable, while a field of one gauss (approximately the magnitude of the Earth's magnetic field) is quite good.

Another problem caused by stray magnetic fields in disk systems is the coupling of excessive cross talk into the front end of a system's read pre-amplifier by the AC component of the stray magnetic flux induced by the energized coil of an actuator. Although the degree to which this is a problem is partially a function of lead routing and packaging, it is nevertheless, also a function of the amplitude of the flux induced by the actuator coil.

To limit the effect of stray magnetic fields, previous actuators have been designed with the coil assembly of the actuator positioned well away from the magnetic heads and disks. Although the amplitude of the stray magnetic fields in the region of the disks and recording heads can be reduced using this design approach, the "cost" of this approach is large moving masses, an undesirable by-product, and cantilevered structures with attendant resonance and stiffness concerns. Conventional recording systems using a comb structure to support the recording heads readily lend themselves to this approach because their actuator coil is already positioned away from the recording disks and heads. In contrast, in newer high end, high performance, large disk files, such as the planar actuator disclosed in patent application Ser. No. 06/221,607, filed Dec. 31, 1980, abandoned in favor of continuation application Ser. No. 06/517,987, filed July 28, 1983, which utilize modular, multiple, independent actuators positioned between two disk surfaces, this approach is unacceptable. It would negatively affect the performance capabilities of the system by precluding the actuator and coil assembly from being placed close to, or inside the disk stack to reduce the length of moving parts, and thereby the amount of mass that must be moved, and provide improved operating characteristics. One approach that has been pursued in planar actuators has been the use of a small air gap between two core plates constructed from large amounts of iron to contain the flux developed by the energized coil. Although this approach reduces stray flux, further reductions in stray flux are desirable. Accordingly, there is a need to provide an actuator coil arrangement which minimizes the stray magnetic fields induced in the region of the disks and recording heads of known magnetic recording disk systems.

BACKGROUND ART

U.S. Pa. No. 4,314,295 issued to Frandsen and entitled "Linear Actuator With Staggered Flat Coils" discloses a disk drive apparatus which includes an array of flat-coil actuators using a plurality of overlapped flat coil sets interacting with a plurality of surrounding magnets for stepping such actuators into position. In operation, only one of the overlapped coil sets is energized at any one time.

U.S. Pat. No. 4,396,966 issued to Scranton et al and entitled "Low Mass Actuator System For Magnetic Recording Disks With Half Strength End Poles" discloses a linear actuator comprised of a stator including a number of permanent magnets of opposite polarity arranged in an array side by side, and a shuttling armature comprised of a pair of flat coils. At each end of the array of magnets there is provided a half strength magnet for closing the magnetic circuit so as to reduce flux which emanates towards the disk and recording heads of the disk recording system.

SUMMARY OF THE INVENTION

The present invention is directed to an electromagnetic circuit which minimizes the amplitude of stray magnetic fields induced in the region of the recording disk and recording heads of a magnetic recording disk system. According to the present invention, a linear disk actuator is provided with a plurality of actuator coils, at least two of which are energized simultaneously to significantly reduce the amplitude of stray magnetic fields induced at a system's recording heads and disks upon the energization of such coils. By directing the flow of current in the two coils wound around the moving part of the actuator in opposite directions so that magnetically opposite fields are generated, a net field is produced which is very low in amplitude. Ideally, where the two energized coils are positioned very close to one another so that they are tightly coupled inductively, the net field produced by the two coils is negligible.

In one embodiment the coils are wound on the moving part of the actuator so as to contribute usefully to the production of force and the resulant acceleration used to translate the moving part of the actuator. They interact with the alternating magnetic field produced by a set of alternating poles positioned on the stationary part of the actuator to produce the required translation. Although the currents in each coil are opposite in direction, the mechanical forces generated by the two coils add to move the actuator because the directions of the magnetic fields produced by the corresponding alternating poles are also opposite in polarity at each coil. Thus, the force needed for good acceleration of the actuator is achieved, while the amplitude of stray magnetic fields in the region of the disks and recording heads is minimized.

DETAILED DESCRIPTION OF THE PREFERRED EMBODIMENTS OF THE INVENTION

Figure 1:
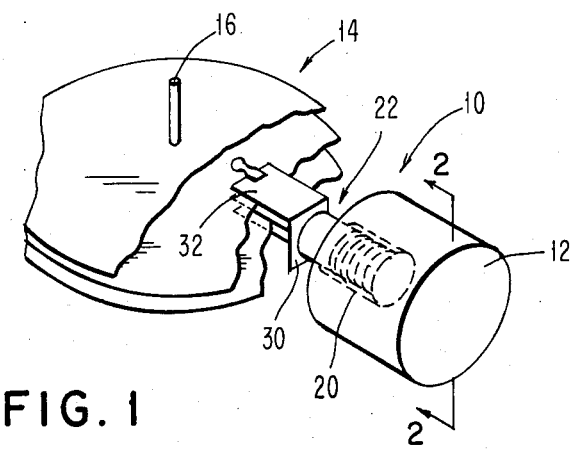
FIG. 1 is a partial perspective view of a conventional actuator, partially shown in phantom.
Figure 2:
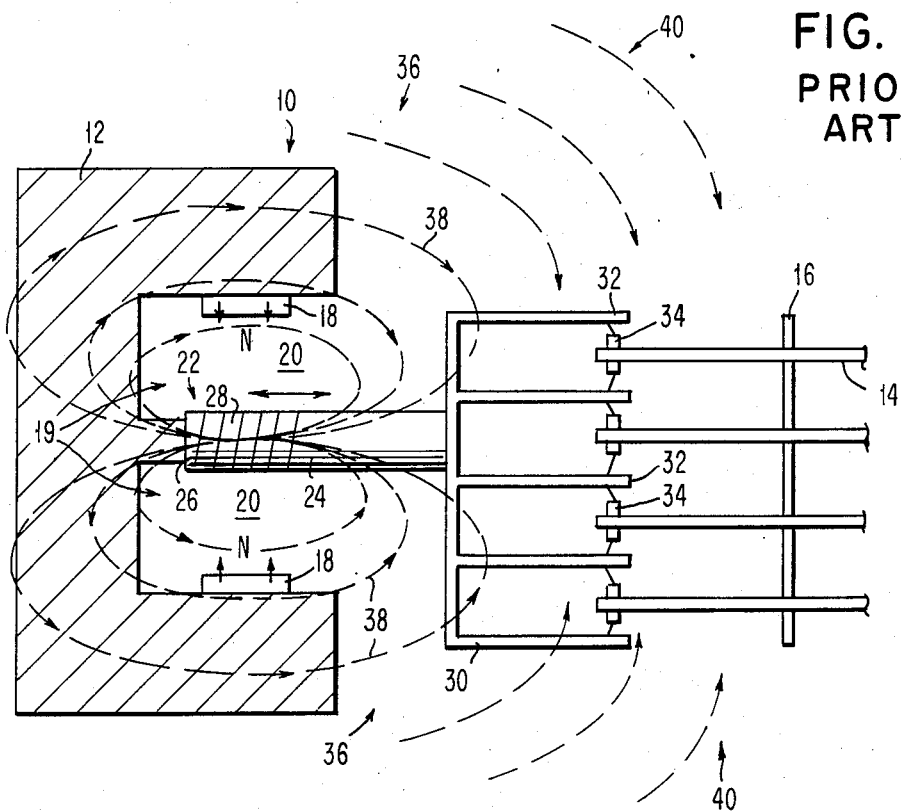
FIG. 2 is a side elevational, partially in section, of the actuator shown in FIG. 1.

FIG. 1 shows a conventional linear actuator 10 used in a magnetic recording disk system. FIG. 2 is a partial cross-sectional view of the linear actuator shown in FIG. 1 taken along the line 2—2 shown therein. The conventional actuator shown in FIGS. 1 and 2 includes a magnetic assembly which consists of a large iron core stator assembly 12, positioned adjacent to a plurality of magnetic recording disks 14 rotatably mounted on a spindle assembly 16, and a number of semi-annular permanent magnets 18 mounted within a circular cavity 19 formed with stator assembly 12.

Located within cavity 19 of stator assembly 12 is a cylindrical, translatable actuator assembly 22. This assembly includes a movable armature 24 supported by a plurality of ball bearings (not shown) on an iron shaft 26 extending from the center of stator assembly 12, and a cylindrical coil 28 consisting of a series of turns wound upon armature 24 substantially near one end thereof.

Attached to the opposite end of armature 24 is a comb structure 30 having a number of fingerlike projections 32 upon which a series of magnetic recording heads 34 are mounted. Comb structure 30 allows all of the recording heads 34 to address their respective disk surfaces simultaneously. For this purpose actuator coil 28 is energized by a current which produces a magnetic field 36 that interacts with the magnetic field produced by permanent magnets 18 in air gap 20 to create a mechanical force that causes armature 24 to translate either toward or away from the stack of recording disks. As can be seen in FIG. 2, the magnetic field 36 created by the energization of coil 28 is comprised of a series of flux lines 38 that emanate outwardly from coil 28. A portion 40 of the magnetic field produced by the actuator coil strays to the region where disks 14 and recording heads 34 are situated. As previously noted, where the amplitude of this stray magnetic field is sufficiently high, information stored on disks 14 can be lost due to erasure.

Figure 3:
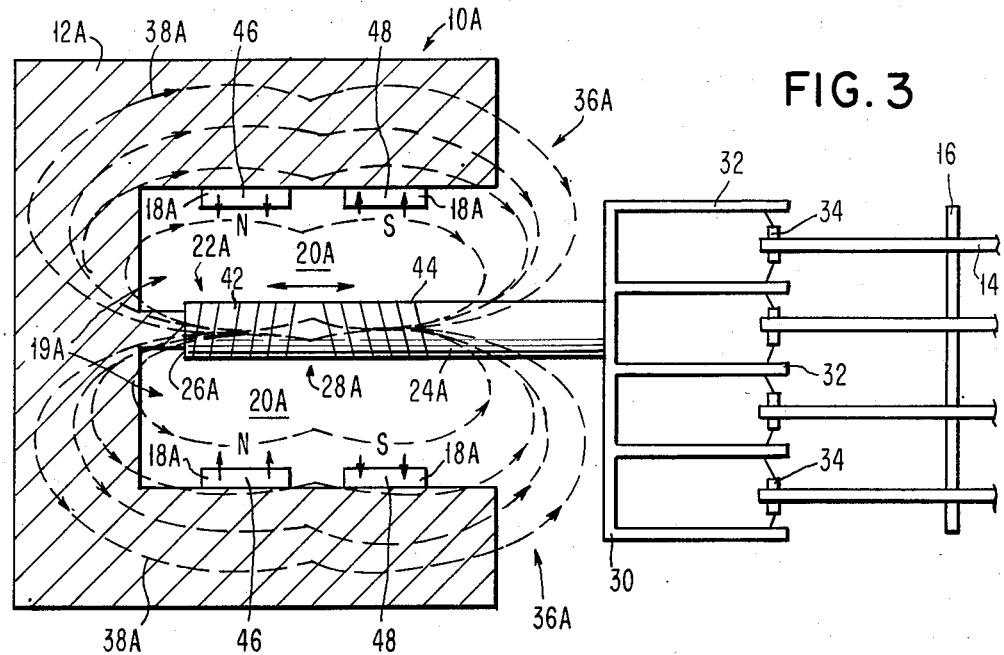
FIG. 3 is a side elevational view, partially in section, of a conventional disk actuator modified to incorporate the magnetic circuit of the present invention.

FIG. 3 shows a conventional actuator in which the coil assembly has been modified to incorporate the present invention. As shown in FIG. 3, the portion of the actuator assembly 22A within cavity 19A is slightly longer than the portion of the actuator assembly 22 within cavity 19 of the disk actuator shown in FIG. 2. Assembly 22A is slightly longer in length to accommodate a plurality of actuator coils 28A wound thereon. In the embodiment shown in FIG. 3, a total of two armature coils are used. A first of these coils 42 is wound on armature 24A in a clockwise direction, while the second of these coils 44 is wound on armature 24A in a counterclockwise direction. By winding each of these coils in a different direction, the fields produced by their energizing currents are in an opposing relationship so as to produce a net field 36A that is very low in amplitude outside stator assembly 12A. By reducing the amplitude of the net field produced upon energization of the actuator coils, the stray magnetic field that appears in the region of the disks 14 and the recording heads 34 can be materially reduced or rendered negligible as shown in FIG. 3. Here, it can be seen that the flux density of magnetic field 36A is considerably reduced in comparison to that shown for the actuator arrangement of FIG. 2.

As can also be seen in FIG. 3, the stator assembly 12A of the actuator shown therein is slightly enlarged to accommodate additional permanent magnets. In the embodiment shown in FIG. 3, semi-annular permanent magnets 18A are arranged as a pair of alternating poles which form an almost uniform, radially symmetric magnetic field in a cylindrical gap 20A. This field interacts with the magnetic field produced by the two coils wound on armature 24A to produce the mechanical force necessary to displace shaft 24A and thereby allow recording heads 34 to address the surfaces of disks 14. Even though the currents in coils 42 and 44 are physically opposite in direction, the direction of the interacting magnetic fields produced by alternating permanent magnetics 18A are also opposite in polarity, respectively, so that the forces generated thereby add to allow armature 24A to be moved.

Figure 4:
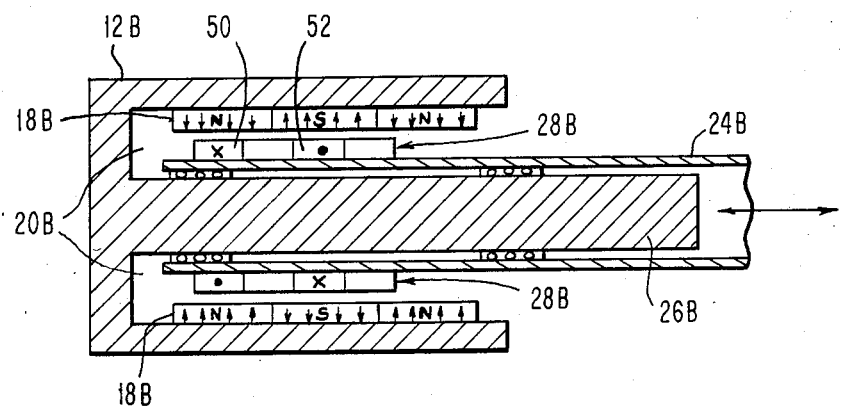
FIG. 4 is a side elevational view, in section, of a conventional actuator utilizing an alternative embodiment of the present invention in which multiple coils and permanent magnets are used.

Although the embodiment shown in FIG. 3 utilizes a coil assembly consisting of only two coils, it should be understood that other numbers of coils can be used to practice the invention, provided at least two of such coils are energized simultaneously so that the fields produced by the two coils are opposite. An alternative embodiment of the invention in which four actuator coils are used is shown in FIG. 4. As shown therein, only the first and third coils of assembly 28B have been energized. In the first of these, 50, current is flowing counterclockwise, while in the third, 52, current is flowing opposite this direction, or clockwise.

The permanent magnets 18B used in the embodiment shown in FIG. 4 also include more magnets than the embodiment shown in FIG. 3. Here, permanent magnets 18B are positioned adjacent one another to provide a series of alternating poles that produce a uniform, radially symmetric magnetic field in a cylindrical gap 20B between the magnets and actuator coil assembly 28B.

Opposite direction of current flow in the two energized coils producing the opposing fields can be achieved by either using opposite winding directions, i.e., clockwise and counterclockwise, for the two coils, or employing opposite polarity connections to the leads of the two coils where they are wound in the same direction, i.e., both clockwise or counterclockwise. In the latter case, the lead-in wire of one coil would be connected to the same polarity terminal of the voltage source used to energize the two coils as the corresponding lead-out wire of the other coil, and vice versa. In the former case, the lead-in wires of both coils would be connected to the same polarity terminal, while the lead-out wires of both coils would be connected to the other, opposite polarity terminal.

Figure 5:
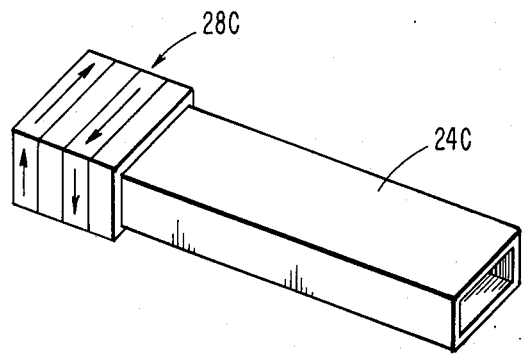
FIG. 5 is a perspective view of one alternative embodiment of the present invention in which the armature of the actuator has four sides.
Figure 6:
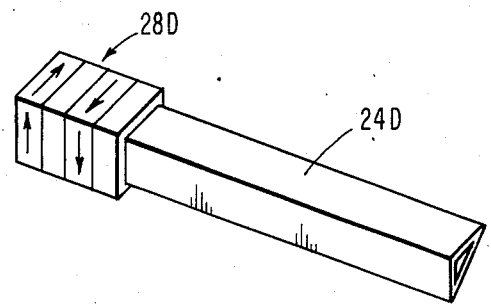
FIG. 6 is a perspective view of a second alternative embodiment of the present invention in which the armature of the actuator has three sides.

Although the present invention has been described in the context of conventional linear disk actuators using cylindrical coils wound around a cylindrical movable shaft, it should be understood that its application is not limited to this design. FIGS. 5 and 6 show examples of alternative embodiments in which the conventional armature on which the plurality of actuator coils is wound has a cross-section which is other than circular. FIG. 5 shows one example of a four-sided armature 24C with an actuator coil assembly 28C consisting of four coils shaped to accommodate the four-sided shape of the armature. The four-sided shape of armature 24C can be square, rectangular or otherwise, depending upon the needs of the particular application in which it is used.

Alternatively, FIG. 6 shows one example of a three-sided armature 24D with an actuator coil assembly 28D again consisting of four adjacent coils shaped to accommodate the three-sided shape of the armature. Here, the shape of armature 24D is generally triangular, with specific variations such as an equilateral triangle shape, isosceles triangle shape or other three-sided shape again being dependent upon the needs of the particular application.

Although the opposing magnetic fields produced by the simultaneously energized coils of the embodiments shown in FIGS. 5 and 6 include flux build up at the sharp corners of such armatures, the resulting net magnetic field produced by the two coils will still be limited in amplitude, such that the amplitude of the stray magnetic field in the region of the disks and recording heads will be negligible.

It should be noted that alternative armature shapes, other than those shown in FIGS. 5 and 6, may be used with the present invention. It should also be noted that while the shape of the iron shaft 26 supporting the armature will generally conform to the specific shape of the armature, the shape of the coils wound on the armature need not.

Figure 7:
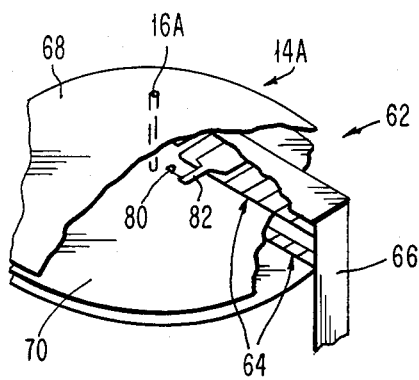
FIG. 7 is a partial perspective view of a planar actuator, partially shown in phantom, encompassing the magnetic circuit of the present invention.
Figure 8:
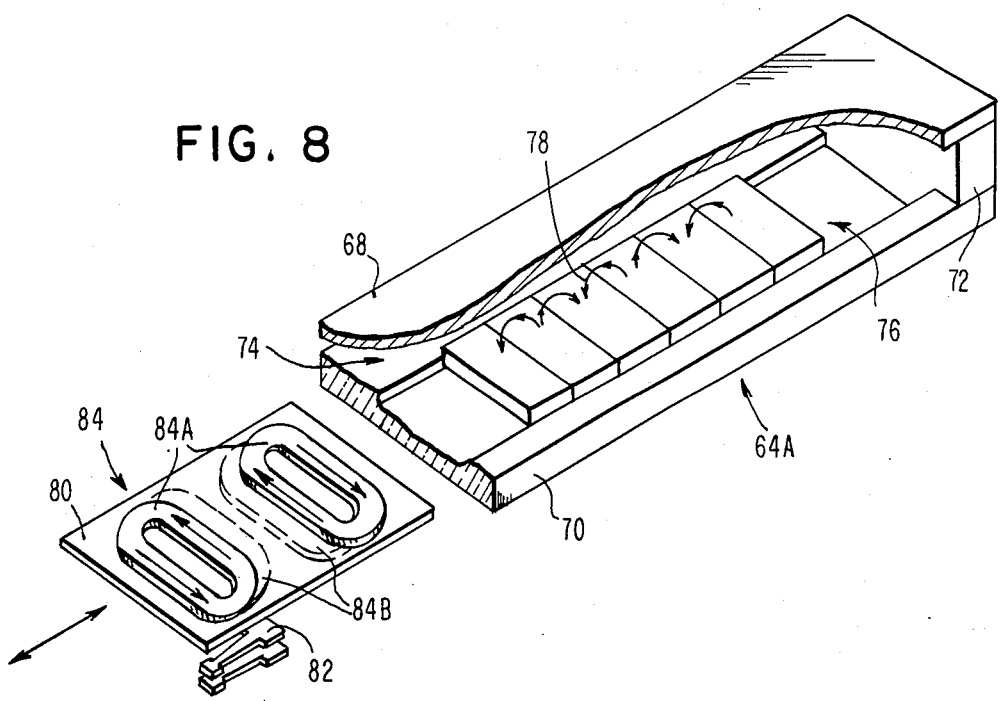
FIG. 8 is a partial perspective view of the planar actuator of FIG. 7 in which one actuator and its permanent magnets and flat coils are shown in greater detail.

The planar actuator 62 shown in FIGS. 7 and 8, which is similar to the planar actuator disclosed in previously identified application Ser. No. 06/517,987, encompasses the preferred embodiment of the present invention. As can be seen in FIG. 7, the planar design uses multiple independent actuators 64 cantilevered on a vertical support 66. Each of these actuators fits between two of a number of disks 14A rotatably mounted on a spindle assembly 6A to provide simultaneous accessing of one surface of each of two adjacent disks.

One of these actuators 64A is shown in greater detail in FIG. 8. The stationary portion of stator assembly of actuator 64A is constructed from two iron plates 68 and 70 joined in a spaced-apart parallel orientation at one end by a vertically disposed plate 72 attached to vertical support 66. The spaced-apart parallel orientation of plates 68 and 70 forms an air gap 74 between them. The lower of these two plates 70 supports a series of flat magnets 76 of alternating polarity. These magnets produce a high amplitude field within the air gap 74 between plates 68 and 70 which alternates in direction from magnet to magnet. Magnetic flux arrows 78 indicating flux direction in the field also show the flux pattern in iron plates 68 and 70.

The armature of the planar actuator assembly is a flat plate 80 slidably mounted within the air gap 74 between iron plates 68 and 70. Mounted on one side of this armature are a plurality of recording heads 82 which address the two surfaces corresponding to the two disks between which the actuator assembly is inserted. In accordance with the present invention, armature 80 also carries a plurality of flux pancake coils 84, at least two of which are energized simultaneously to produce opposing fields so that a net field of low amplitude is produced. In the embodiment shown in FIG. 8, coils 84 are arranged in overlapping pairs 84A and 84B, one pair of which is energized to produce the net field of low amplitude. It should be noted, however, that coils 84 could be arranged in series, provided they are aligned with corresponding ones of the permanent magnets so that the two energized coils both contribute to useful force. This reduces the amount of stray field lower than that present in similar planar actuator systems not incorporating the present invention. In the embodiment shown in FIG. 8, the two flat coils comprising coil pair 84A are simultaneously energized with currents flowing in physically opposite directions to produce a net field of low amplitude. Because both coils are on the moving armature 80 of the actuator, they react with the fields from the stator magnets to contribute usefully to the production of the force and acceleration necessary for the recording heads to move and address the surfaces of disks 14A in acceptable periods of time.

To achieve opposite current flow directions in the coils 84 shown in FIG. 8, the previously described wiring techniques for conventional actuators may also be used with the flat coils of the embodiment shown in FIGS. 7 and 8. The only requirement is that at least two coils be energized simultaneously and that the physical direction of current flow in the two coils be opposite so that they produce opposing fields that in turn produce a net field which is negligible in amplitude.

In the present invention, the force produced on the coil assembly is balanced by an equal and opposite force on the magnet assembly. Thus it is obvious to those skilled in the art that an actuator may be comprised of an assembly of multiple coils affixed to a stationary, magnetically permeable housing, such as iron. Within the housing is a translatable member carrying a plurality of magnets. In accordance with the present invention, significant reduction in stray magnetic fields from the coils can be achieved by energizing two coils simultaneously with currents in opposite directions, so as to produce a net field of very low amplitude. The stationary energized coils interact with the alternating magnets mounted on the translatable part of the actuator so as to produce a net force to usefully translate the magnets and the translatable member.

While the invention has been particularly shown and described with respect to preferred embodiments thereof, it will be understood by those skilled in the art that the foregoing and other changes and details may be made therein without departing from the spirit and scope of the invention.

Having thus described our invention, what we claim as new, and desire to secure by Letters Patent is:

1. An actuator having a translatable member attached to an object to be moved and encompassing a magnetic circuit for minimizing the amplitude of stray magnetic fields produced by the actuator comprising:

a magnetic assembly comprised of a plurality of alternating magnetic poles, said poles being disposed to alternate in the direction of displacement of said translatable member to provide a working flux component in said direction, a coil assembly disposed substantially adjacent to said magnetic assembly, said coil assembly being comprised of a plurality of actuator coils positioned to react with respective ones of said alternating magnetic poles for displacing said translatable member, and means for simultaneously energizing at least two of said plurality of actuator coils in magnetically opposed relationship to produce a net magnetic field of minimal amplitude.

2. An actuator as recited in claim 1 wherein said coil assembly is further comprised of said translatable member attached to said object to be moved, said plurality of actuator coils being wound on said translatable member, and wherein said magnetic assembly further comprises a core member permeable to magnetic lines of force, having a cavity in which said alternating magnetic poles are positioned, and a core projection movably supporting said translatable member.

3. An actuator as recited in claim 1 wherein said magnetic assembly is further comprised of said translatable member attached to said object to be moved, and wherein said coil assembly further comprises a core member, permeable to magnetic lines of force, having a cavity in which said alternating magnetic poles are positioned, and a core projection movably supporting said translatable member, said plurality of actuator coils being wound on said core member.

4. A disk actuator for magnetic storage disk systems encompassing a magnetic circuit for minimizing the amplitude of stray magnetic fields in the region of a storage system's recording disks and recording heads comprising:

a magnetic assembly comprised of a plurality of alternating magnetic poles, said poles being disposed to alternate in the direction of the displacement of said actuator to produce a working flux in said direction, a coil assembly movably supported within said magnetic assembly, a plurality of recording heads attached to said coil assembly, said coil assembly being comprised of a plurality of actuator coils positioned to react with respective ones of said alternating magnetic poles for displacing said coil assembly, and means for simultaneously energizing at least two of said plurality of actuator coils in magnetically opposed relationship to minimize the net magnetic field in the region of the disks and recording heads.

5. A disk actuator as recited in claim 4 wherein said coil assembly is further comprised of a translatable member attached to the recording heads, said plurality of actuator coils being wound on said translatable member, and wherein said magnetic assembly further comprises a core member permeable to magnetic lines of force, having a cavity in which said alternating magnetic poles are positioned, and a core projection movably supporting said translatable member.

6. A disk actuator as recited in claim 5 wherein said translatable member has a cross section formed by a single curved side, and wherein each of said plurality of actuator coils wound on said translatable member is of a shape which corresponds to said single curved side cross section.

7. A disk actuator as recited in claim 5 wherein said core member has a cross section formed by a single curved side, and wherein said translatable member has a cross section which corresponds to said single curved side cross section.

8. A disk actuator as recited in claim 5 wherein said translatable member has a four-sided cross section, and wherein each of said plurality of actuator coils wound on said translatable member is of a shape which corresponds to said four-sided cross section.

9. A disk actuator as recited in claim 5 wherein said core member has a four-sided cross section, and where said translatable member has a cross section which corresponds to said four-sided cross section.

10. A disk actuator as recited in claim 5 wherein said translatable member has a three-sided cross section, and wherein each of said plurality of actuator coils wound on said translatable member is of a shape which corresponds to said three-sided cross section.

11. A disk actuator as recited in claim 10 wherein said core member has a three-sided cross section, and wherein said translatable member has a cross section which corresponds to said three-sided cross section.

12. A disk actuator as recited in claim 10 wherein said translatable member has a poly-sided cross section, and wherein each of said plurality of actuator coils wound on said translatable member is of a shape which corresponds to said poly-sided cross section.

13. A disk actuator as recited in claim 5 wherein said core member has a poly-sided cross section, and wherein said translatable member has a cross section which corresponds to said poly-sided cross section.

14. A disk actuator as recited in claim 4 wherein said coil assembly is further comprised of a generally flat translatable member and each of said plurality of actuator coils is of a generally flat shape and is mounted on said translatable member, and wherein said magnetic assembly further comprises a core member permeable to magnetic lines of force, said core member being comprised of two generally flat members forming an air gap therebetween, said plurality of alternating magnetic poles being mounted on one of said members in series with alternating polarity.

15. A disk actuator as recited in claims 4 or 14 wherein said plurality of actuator coils is comprised of two actuator coils, a first of said two actuator coils being wound on said translatable member in a clockwise direction, a second of said two actuator coils being wound on said translatable member in a counterclockwise direction, said first and second actuator coils each having a lead-in wire connected to a positive terminal of said energizing means and a lead-out wire connected to a negative terminal of said energizing means.

16. A disk actuator as recited in claims 4 or 14 wherein said plurality of actuator coils is comprised of two coils being wound on said translatable member in the same direction, a first of said two coils having a lead-in wire connected to a positive terminal of said energizing means and a lead-out wire connected to a negative terminal of said energizing means, a second of said two coils having a lead-in wire connected to said negative terminal of said energizing means and a lead-out wire connected to said positive terminal of said energizing means.

17. A disk actuator as recited in claims 4 or 14 wherein said plurality of alternating magnetic poles is comprised of a plurality of permanent magnets of alternating polarity.

18. A disk actuator as recited in claim 17 wherein said plurality of permanent magnets is greater than said plurality of actuator coils.

19. A disk actuator as recited in claims 4 or 14 wherein said at least two actuator coils are energized in magnetically opposed relationship by physically opposite currents flowing through said at least two actuator coils.

* * * * *